United States Patent
Martin

(10) Patent No.: US 10,841,807 B2
(45) Date of Patent: *Nov. 17, 2020

(54) TELECOMMUNICATIONS APPARATUS AND METHODS

(71) Applicant: Sony Corporation, Tokyo (JP)

(72) Inventor: Brian Alexander Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 16/157,839

(22) Filed: Oct. 11, 2018

(65) Prior Publication Data

US 2019/0045373 A1 Feb. 7, 2019

Related U.S. Application Data

(63) Continuation of application No. 15/504,145, filed as application No. PCT/EP2015/069742 on Aug. 28, 2015, now Pat. No. 10,111,106.

(30) Foreign Application Priority Data

Sep. 24, 2014 (EP) .................................... 14186237

(51) Int. Cl.
*H04W 72/00* (2009.01)
*H04W 16/14* (2009.01)
(Continued)

(52) U.S. Cl.
CPC ....... *H04W 16/14* (2013.01); *H04W 72/0453* (2013.01); *H04W 72/1215* (2013.01); *H04W 76/16* (2018.02)

(58) Field of Classification Search
CPC ............. H04W 16/14; H04W 72/0453; H04W 72/1215; H04W 76/16
See application file for complete search history.

(56) References Cited

U.S. PATENT DOCUMENTS

2005/0245269 A1 11/2005 Demirhan et al.
2009/0285135 A1* 11/2009 Rousu .................. H04B 1/0057
370/297

(Continued)

FOREIGN PATENT DOCUMENTS

CN 102714538 A 10/2012
CN 103929811 A 7/2014

(Continued)

OTHER PUBLICATIONS

Office Action and Search Report issued in Taiwanese Application 104124560 dated Jan. 19, 2019.

(Continued)

*Primary Examiner* — Stephen M D Agosta
(74) *Attorney, Agent, or Firm* — Xsensus LLP

(57) ABSTRACT

A network infrastructure equipment establishes a configuration of radio resources within a second frequency band for use by a terminal device for communications with network infrastructure equipment based on a first radio access technology and communicates an indication of that to the terminal device. The terminal device establishes a configuration of radio resources for use by the terminal device for communications based on a second radio access technology and determines if there is any overlap in radio resources configured for use by two different radio access technologies, and if so communicates an indication of that to the network infrastructure equipment. In response the network infrastructure equipment establishes a replacement configuration of radio resources for communications with the terminal device based on the first radio access technology that avoids the radio resources indicated as subject to overlap, and transmits an indication of the replacement configuration to the terminal device.

17 Claims, 5 Drawing Sheets

(51) Int. Cl.
*H04W 72/12* (2009.01)
*H04W 72/04* (2009.01)
*H04W 76/16* (2018.01)

(56) References Cited

U.S. PATENT DOCUMENTS

| | | | | |
|---|---|---|---|---|
| 2009/0286569 | A1* | 11/2009 | Rousu | H01P 1/213 |
| | | | | 455/553.1 |
| 2010/0041358 | A1 | 2/2010 | Wood | |
| 2011/0039554 | A1* | 2/2011 | Bims | H04L 1/0033 |
| | | | | 455/434 |
| 2012/0140690 | A1* | 6/2012 | Choi | G01S 19/03 |
| | | | | 370/311 |
| 2012/0149362 | A1 | 6/2012 | Tooher et al. | |
| 2012/0282942 | A1 | 11/2012 | Uusitalo et al. | |
| 2012/0302273 | A1* | 11/2012 | Lin | H04W 16/14 |
| | | | | 455/509 |
| 2012/0307697 | A1 | 12/2012 | Mukhopadhyay | |
| 2013/0195013 | A1 | 8/2013 | Ahn et al. | |
| 2013/0331137 | A1* | 12/2013 | Burchill | H04W 52/243 |
| | | | | 455/501 |
| 2014/0050134 | A1 | 2/2014 | Ahn et al. | |
| 2014/0334330 | A1 | 11/2014 | Baghel et al. | |
| 2014/0341193 | A1 | 11/2014 | Lee et al. | |

FOREIGN PATENT DOCUMENTS

| | | |
|---|---|---|
| EP | 14171284.4 | 6/2014 |
| EP | 14171285.1 | 6/2014 |
| KR | 10-2013-0087309 | 8/2013 |
| KR | 10-2014-0023849 | 2/2014 |
| KR | 10-2014-0047128 | 4/2014 |
| KR | 10-2014-0110907 A1 | 9/2014 |
| WO | 2013019177 A1 | 2/2013 |
| WO | 2013071488 A1 | 5/2013 |
| WO | 2013085256 A1 | 6/2013 |
| WO | 2013115514 A1 | 8/2013 |

OTHER PUBLICATIONS

Office Action dated Feb. 7, 2020 in Korean Patent Application No. 10-2019-7010130, 7 pages.
Office Action dated Feb. 24, 2020 in European Patent Application No. 18 193 247.6, 9 pages.
Office Action dated Jan. 23, 2018 in European Patent Application No. 15 763 233.2.
Office Action dated Feb. 4, 2018 in corresponding Korean Patent Application No. 10-2017-7007714 (with English Translation), citing documents AO and AX therein, 14 pages.
ETSI TS 136 331 V11.8.0 (Jul. 2014), "Technical Specification, LTE; Evolved Universal Terrestrial Radio Access (E-UTRA); Radio Resource Control (RRC); Protocol specification (3GPP TS 36.331 version 11.8.0 Release 11 )", Jul. 2014, pp. 1-358 and Cover page.
H. Holma, et al., "LTE for UMTS OFDMA and SC-FDMA Based Radio Access," John Wiley and Sons, 2009, 4 pages, Pub Date is Jan. 2009.
ETSI TS 136 211 V11.5.0 (Jan. 2014), "Technical Specification L TE; Evolved Universal Terrestrial Radio Access (E-UTRA); Physical channels and modulation (3GPP TS 36.211 version 11.5.0 Release 11 )," Jan. 2014, 122 pages.
ETSI TS 136 212 V11 .4.0 (Jan. 2014), "Technical Specification LTE; Evolved Universal Terrestrial Radio Access (E-UTRA); Multiplexing and channel coding (3GPP TS 36.212 version 11.4.0 Release 11 )," Jan. 2014, 86 pages.
ETSI TS 136 213 V11.6.0 (Mar. 2014), "Technical Specification L TE; Evolved Universal Terrestrial Radio Access (E-UTRA); Physical layer procedures (3GPP TS 36.213 version 11 .6.0 Release 11 )," Mar. 2014, 184 pages.
ETSI TS 136 321 V11.5.0 (Mar. 2014), "Technical Specification L TE; Evolved Universal Terrestrial Radio Access (E-UTRA); Medium Access Control (MAC) protocol specification (3GPP TS 36321 version 11.5.0 Release 11)," Mar. 2014, 59 pages.
ETSI TS 136 331 V12.2.0 (Jun. 2014), "Technical Specification 3rd Generation Partnership Project; Technical Specification Group Radio Access Network; Evolved Universal Terrestrial Radio Access (E-UTRA); Radio Resource control (RRC); Protocol specification (Release 12)," Jun. 2014, 365 pages.
ETSI TR 136 816 V11.2.0 (Dec. 2011), "Technical Report 3rd Generation Partnership Project; Technical Specification Group AW Radio Access Network; Evolved Universal Terrestrial Radio Access (E-UTRA); Study on signalling and procedure for interference avoidance for in-device coexistence (Release 11 )," Dec. 2011, 44 pages.
ETSI TS 136 300 V12.2.0 (Jun. 2014), "Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Staqe 2 (Release 12)," Jun. 2014, 215 pages.
International Search Report dated Mar. 1, 2016 in PCT/EP2015/069742 filed Aug. 28, 2015.
Extended European Search Report dated Sep. 27, 2018 in European Application No. 18193247.6-1231.

* cited by examiner

TELECOMMUNICATIONS APPARATUS AND METHODS

CROSS-REFERENCE TO RELATED APPLICATIONS

This application is a continuation of Ser. No. 15/504,145 filed Feb. 15, 2017, which is a National Stage Entry of International Patent Application No. PCT/EP2015/069742 filed Aug. 28, 2015, and claims priority to European Patent Application 14 186 237.5, filed in the European Patent Office on Sep. 24, 2014, the entire contents of each of which being incorporated herein by reference.

BACKGROUND

Field

The present disclosure relates to mobile communications networks and methods for communicating data using mobile communications networks, infrastructure equipment for mobile communications networks, communications devices for communicating data via mobile communications networks and methods of communicating via mobile communications networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

It is well known in the field of wireless telecommunications for regions of the radio spectrum to be assigned to different mobile network operators (MNO) for their exclusive use through a license. A license typically grants an MNO exclusive use over a number of years of a predefined portion of the radio frequency spectrum in which to deploy a mobile communications network (e.g. GSM, WCDMA/HSPA, LTE/LTE-A). As a result of this approach, an operator has guarantees of no other radio services interfering with the radio resources that have been assigned to the operator, and within the limitations of the license conditions it has exclusive control over what radio technology it deploys in the network. Consequently, a wireless telecommunications system that is primarily designed to operate using radio resources that have been licensed for exclusive use by the wireless telecommunications system can operate with a degree of centralised control and coordination to help make most efficient use of the available radio resources. Such a wireless telecommunication system also manages all the interference internally, based on standard specifications, since the license grants it good immunity from external interference sources. Coexistence of different devices deployed on an MNO's licensed band is managed through conformance to relevant radio standards. Licensed spectrum is today usually assigned to operators via government-organised auctions, but so-called "beauty contests" continue also to be in use.

It is also well known in the field of wireless telecommunications for regions of the available radio spectrum to remain unlicensed. Unlicensed (license exempt) radio spectrum may, at least to some extent, be freely used by a number of different technologies, such as Wi-Fi and Bluetooth and other non-3GPP radio access technologies. Operating parameters for devices using unlicensed spectrum bands are typically stipulated by technical regulatory requirements such as e.g. the FCC Part 15 rule for 2.4 GHz ISM band. Coexistence of different devices deployed on unlicensed band, due to the lack of centralised coordination and control, is usually based on such technical rules and various politeness protocols.

The use of wireless telecommunications system technologies designed for operation on licensed radio spectrum, such as LTE, is becoming more and more prevalent, both in terms of increasing take-up of established uses for wireless telecommunications technologies, and also the introduction of new uses, e.g., in the developing field of machine-type communications (MTC). In order to help provide more bandwidth to support this increased use of wireless telecommunications technologies, it has recently been proposed to use unlicensed radio spectrum resources to support operations on licensed radio spectrum.

However, in contrast to licensed spectrum, unlicensed spectrum can be shared and used among different technologies, or different networks using the same technology, without any coordinated/centralised control, for example to provide protection against interference. As a consequence of this, the use of wireless technologies in unlicensed spectrum can be subject to unpredictable interference and has no guarantees of spectrum resources, i.e. the radio connection takes place on a best effort basis. This means that wireless network technologies, such as LTE, which are generally designed to operate using licensed radio resources, require modified approaches to allow them to efficiently use unlicensed radio resources, and in particular to co-exist reliably and fairly with other radio access technologies that may be simultaneously operating in the unlicensed spectrum band.

Therefore, deploying a mobile radio access technology system primarily designed to operate in licensed spectrum bands (i.e. having exclusive access to, and hence a level of control over, the relevant radio resources) in a manner which is required by operation in unlicensed spectrum bands (i.e. without having exclusive access to at least some of the relevant radio resources), gives rise to new technical challenges.

SUMMARY

According to one aspect of the present disclosure, there is provided a method of operating a terminal device in a wireless telecommunications system for communicating with network infrastructure equipment in accordance with a first radio access technology on a primary cell supporting a primary component carrier on radio resources within a first frequency band and a secondary cell supporting a secondary component carrier on radio resources within a second frequency band, wherein the terminal device is also operable to use radio resources within the second frequency band for communicating in accordance with a second radio access technology, wherein the method comprises: receiving from the network infrastructure equipment an indication of a configuration of radio resources within the second frequency band for use by the terminal device for communications with the network infrastructure equipment in accordance with the first radio access technology; establishing a configuration of radio resources within the second frequency band for use by the terminal device for communications in accordance with the second radio access technology; determining if there is an overlap in the radio resources configured for use by the terminal device for communications in accordance with the first radio access technology and the radio resources configured for use by the terminal device for communications in accordance with the second radio access technology, and if so, transmitting signaling to the network infrastructure equipment to indicate there is an overlap.

According to another aspect of the present disclosure, there is provided a terminal device for use in a wireless telecommunications system for communicating with network infrastructure equipment in accordance with a first radio access technology on a primary cell supporting a primary component carrier on radio resources within a first frequency band and a secondary cell supporting a secondary component carrier on radio resources within a second frequency band, wherein the terminal device is further operable to use radio resources within the second frequency band for communicating in accordance with a second radio access technology, and wherein the terminal device comprises a controller unit and a transceiver unit configured to operate together to: receive from the network infrastructure equipment an indication of a configuration of radio resources within the second frequency band for use by the terminal device for communications with the network infrastructure equipment in accordance with the first radio access technology; establish a configuration of radio resources within the second frequency band for use by the terminal device for communications in accordance with the second radio access technology; determine if there is an overlap in the radio resources configured for use by the terminal device for communications in accordance with the first radio access technology and the radio resources configured for use by the terminal device for communications in accordance with the second radio access technology, and if so, transmit signaling to the network infrastructure equipment to indicate there is an overlap.

According to another aspect of the present disclosure, there is provided circuitry for a terminal device in a wireless telecommunications system for communicating with network infrastructure equipment in accordance with a first radio access technology on a primary cell supporting a primary component carrier on radio resources within a first frequency band and a secondary cell supporting a secondary component carrier on radio resources within a second frequency band, wherein the terminal device is further operable to use radio resources within the second frequency band for communicating in accordance with a second radio access technology, wherein the circuitry comprises a controller element and a transceiver element configured to operate together to: receive from the network infrastructure equipment an indication of a configuration of radio resources within the second frequency band for use by the terminal device for communications with the network infrastructure equipment in accordance with the first radio access technology; establish a configuration of radio resources within the second frequency band for use by the terminal device for communications in accordance with the second radio access technology; determine if there is an overlap in the radio resources configured for use by the terminal device for communications in accordance with the first radio access technology and the radio resources configured for use by the terminal device for communications in accordance with the second radio access technology, and if so, transmit signaling to the network infrastructure equipment to indicate there is an overlap.

According to another aspect of the present disclosure, there is provided a method of operating network infrastructure equipment in a wireless telecommunications system for communicating with a terminal device in accordance with a first radio access technology on a primary cell supporting a primary component carrier on radio resources within a first frequency band and a secondary cell supporting a secondary component carrier on radio resources within a second frequency band, wherein the terminal device is further operable to use radio resources within the second frequency band for communicating in accordance with a second radio access technology, wherein the method comprises: establishing a configuration of radio resources within the second frequency band for use by the terminal device for communications with the network infrastructure equipment in accordance with the first radio access technology: transmitting to the terminal device an indication of the configuration of radio resources within the second frequency band for use by the terminal device for communications with the network infrastructure equipment in accordance with the first radio access technology; receiving from the terminal device an indication of an overlap in the radio resources configured for use by the terminal device for communications in accordance with the first radio access technology and radio resources which the terminal devoice has established are needed for use by the terminal device for communications in accordance with the second radio access technology; establishing a replacement configuration of radio resources within the second frequency band for use by the terminal device for communications with the network infrastructure equipment in accordance with the first radio access technology, wherein the replacement configuration is selected to avoid radio resources in respect of which the overlap is indicated; and transmitting to the terminal device an indication of the replacement configuration of radio resources within the second frequency band for use by the terminal device for communications with the network infrastructure equipment in accordance with the first radio access technology.

According to another aspect of the present disclosure, there is provided network infrastructure equipment for use in a wireless telecommunications system for communicating with a terminal device in accordance with a first radio access technology on a primary cell supporting a primary component carrier on radio resources within a first frequency band and a secondary cell supporting a secondary component carrier on radio resources within a second frequency band, wherein the terminal device is further operable to use radio resources within the second frequency band for communicating in accordance with a second radio access technology, and wherein the network infrastructure equipment comprises a controller unit and a transceiver unit configured to operate together to: establish a configuration of radio resources within the second frequency band for use by the terminal device for communications with the network infrastructure equipment in accordance with the first radio access technology; transmit to the terminal device an indication of the configuration of radio resources within the second frequency band for use by the terminal device for communications with the network infrastructure equipment in accordance with the first radio access technology; receive from the terminal device an indication of an overlap in the radio resources configured for use by the terminal device for communications in accordance with the first radio access technology and radio resources which the terminal devoice has established are needed for use by the terminal device for communications in accordance with the second radio access technology; establish a replacement configuration of radio resources within the second frequency band for use by the terminal device for communications with the network infrastructure equipment in accordance with the first radio access technology, wherein the replacement configuration is selected to avoid radio resources in respect of which the overlap is indicated; and transmit to the terminal device an indication of the replacement configuration of radio resources within the second frequency band for use by the terminal device for communications with the network infrastructure equipment in accordance with the first radio access technology.

According to another aspect of the present disclosure, there is provided circuitry for network infrastructure equipment for use in a wireless telecommunications system for communicating with a terminal device in accordance with a first radio access technology on a primary cell supporting a primary component carrier on radio resources within a first frequency band and a secondary cell supporting a secondary component carrier on radio resources within a second frequency band, wherein the terminal device is further operable to use radio resources within the second frequency band for communicating in accordance with a second radio access technology, and wherein the circuitry comprises a controller element and a transceiver element configured to operate together to: establish a configuration of radio resources within the second frequency band for use by the terminal device for communications with the network infrastructure equipment in accordance with the first radio access technology; transmit to the terminal device an indication of the configuration of radio resources within the second frequency band for use by the terminal device for communications with the network infrastructure equipment in accordance with the first radio access technology; receive from the terminal device an indication of an overlap in the radio resources configured for use by the terminal device for communications in accordance with the first radio access technology and radio resources which the terminal devoice has established are needed for use by the terminal device for communications in accordance with the second radio access technology; establish a replacement configuration of radio resources within the second frequency band for use by the terminal device for communications with the network infrastructure equipment in accordance with the first radio access technology, wherein the replacement configuration is selected to avoid radio resources in respect of which the overlap is indicated; and transmit to the terminal device an indication of the replacement configuration of radio resources within the second frequency band for use by the terminal device for communications with the network infrastructure equipment in accordance with the first radio access technology.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
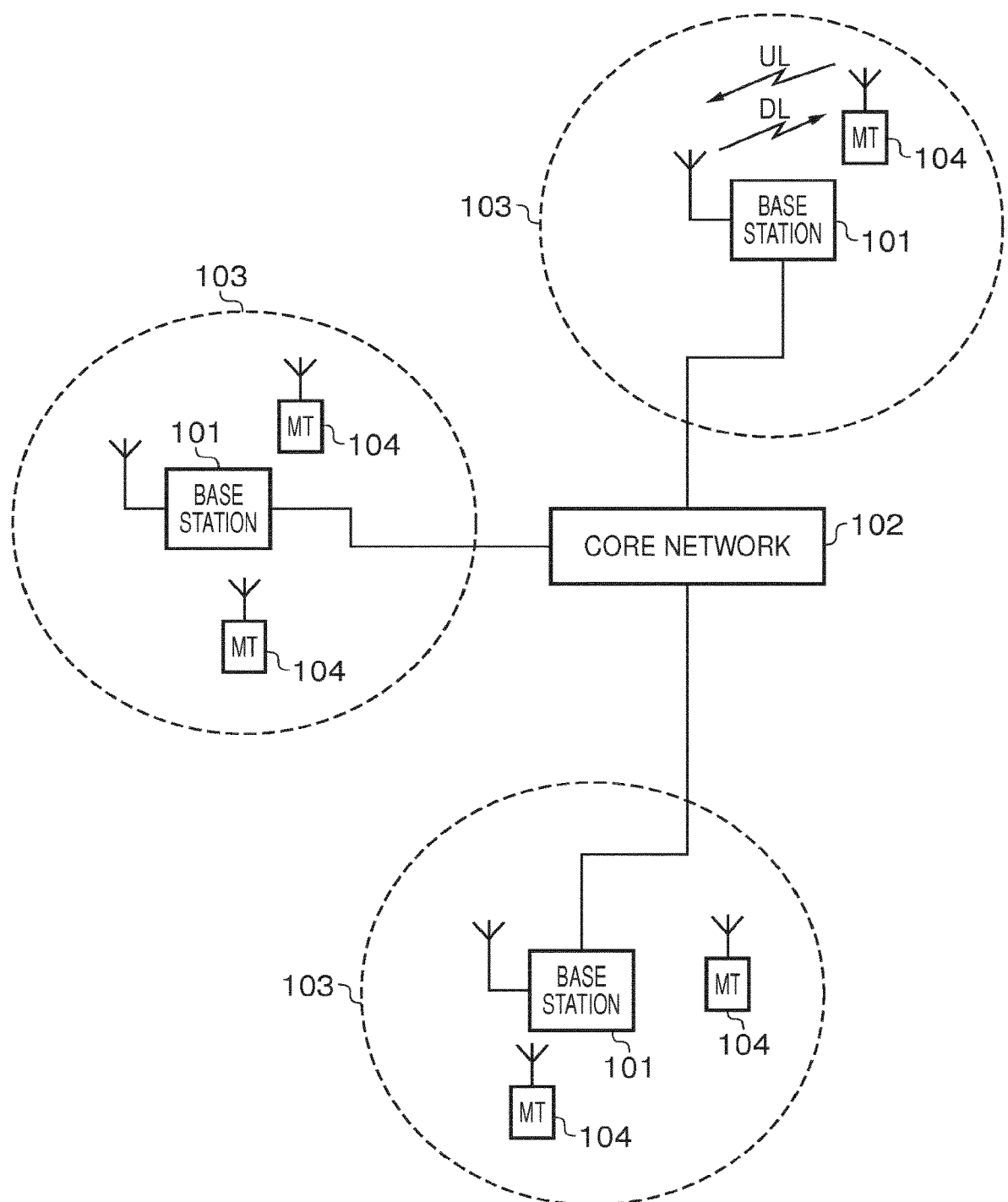
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licensed for use by the operator of the network 100. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-nodeBs, and so forth.

Figure 2:
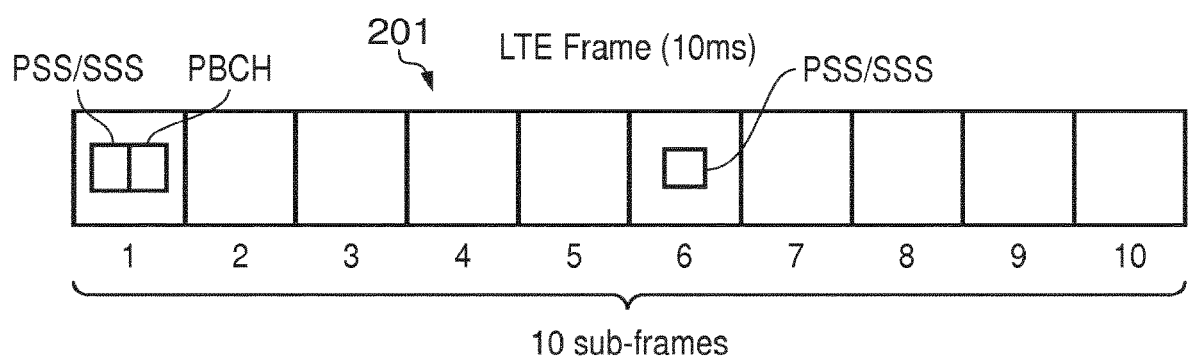
FIG. 2 provides a schematic diagram illustrating a LTE radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
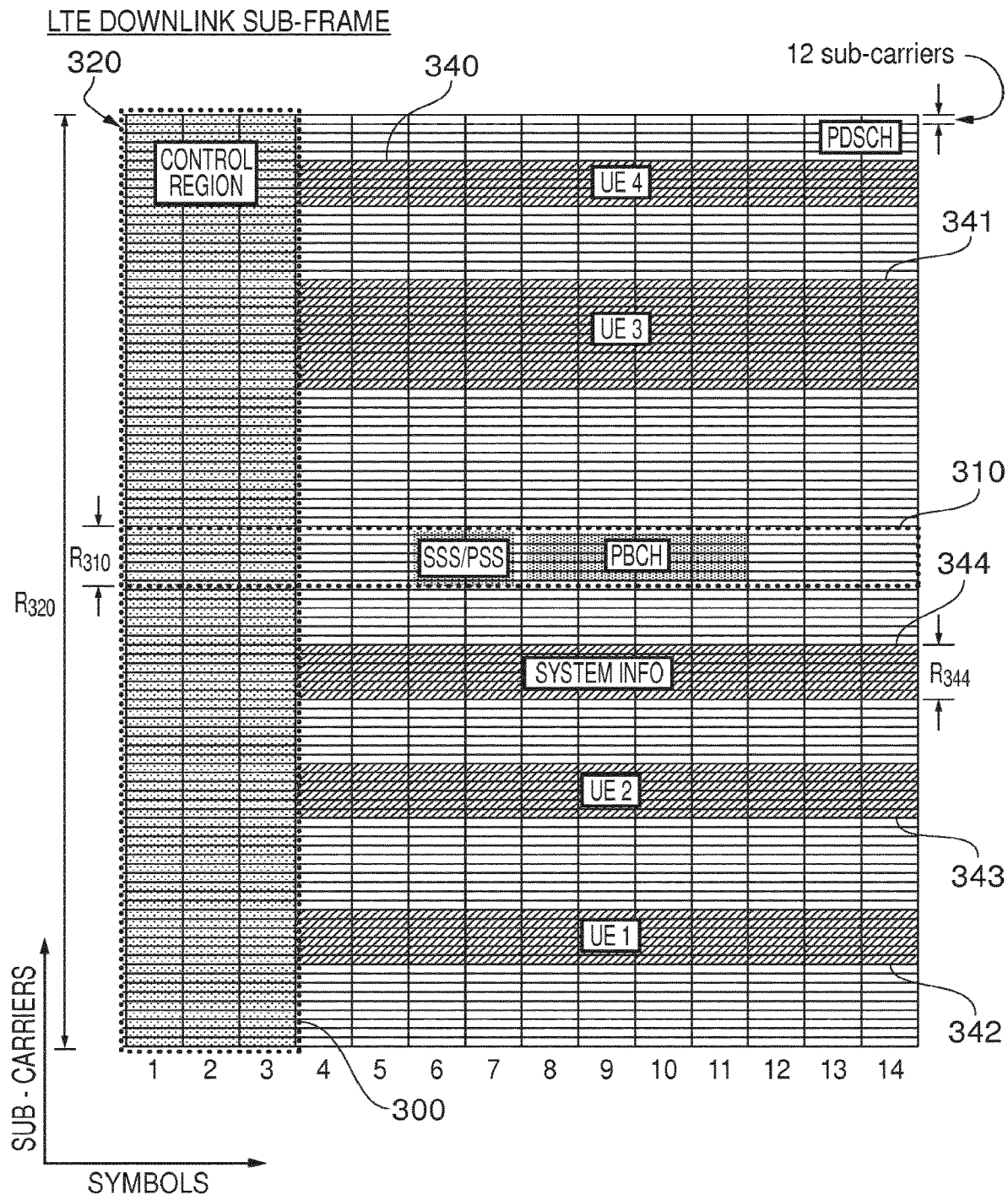
FIG. 3 provides a schematic diagram illustrating an example of a LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth licensed for use by the operator of the network 100, and this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE 1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated to specific terminals (or all terminals or subset of terminals). This may be referred to as physical-layer control signaling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signaling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of R344. A conventional LTE subframe will also include reference signals which are not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity.

The communications between the base stations 101 and the terminal devices 104 are conventionally made using radio resources that have been licensed for exclusive use by the operator of the network 100. These licensed radio resources will be only a portion of the overall radio spectrum. Other devices within the environment of the network 100 may be wirelessly communicating using other radio resources. For example, a different operator's network may be operating within the same geographical region using different radio resources that have been licensed for use by the different operator. Other devices may be operating using other radio resources in an unlicensed radio spectrum band, for example using Wi-Fi or Bluetooth technologies.

As noted above, it has been proposed that a wireless telecommunications network using radio resources in a licensed portion of the radio spectrum might be supported by using radio resources in an unlicensed portion of the radio spectrum (i.e. a portion of the radio spectrum over which the wireless telecommunications network does not have exclusive access, but rather which is shared by other access technologies and/or other wireless telecommunications networks). In particular, it has been proposed that carrier aggregation based techniques may be used to allow license-exempt radio resources to be used in conjunction with licensed radio resources.

In essence, carrier aggregation allows for communications between a base station and a terminal device to be made using more than one carrier. This can increase the maximum data rate that may be achieved between a base station and a terminal device as compared to when using only one carrier and can help enable more efficient and productive use of fragmented spectrum. Individual carriers that are aggregated are commonly referred to as component carriers (or sometimes simply components). In the context of LTE, carrier aggregation was introduced in Release 10 of the standard. In accordance with the current standards for carrier aggregation in an LTE-based system, up to five component carriers can be aggregated for each of downlink and uplink. The component carriers are not required to be contiguous with one another and can have a system bandwidth corresponding to any of the LTE-defined values (1.4 MHz, 3 MHz, 5 MHz, 10 MHz, 15 MHz and 20 MHz), thereby allowing a total bandwidth of up to 100 MHz. Of course it will be appreciated this is just one example of a specific carrier aggregation implementation and other implementations may allow for different numbers of component carriers and/or bandwidths.

Further information on the operation of carrier aggregation in the context of LTE-based wireless telecommunications systems can be found in the relevant standards documents, such as ETSI TS 136 211 V11.5.0 (2014 Jan.)/3GPP TS 36.211 version 11.5.0 Release 11 [2], ETSI TS 136 212 V11.4.0 (2014 Jan.)/3GPP TS 36.212 version 11.4.0 Release 11 [3]; ETSI TS 136 213 V11.6.0 (2014 Mar.)/3GPP TS 36.213 version 11.6.0 Release 11 [4]; ETSI TS 136 321 V11.5.0 (2014 Mar.)/3GPP TS 36.321 version 11.5.0 Release 11 [5]; and ETSI TS 136 331 V12.2.0 (2014 Jun.)/3GPP TS 36.331 version 12.2.0 Release 12 [6].

In accordance with the terminology and implementation used for carrier aggregation in the context of an LTE-based system, a cell is denoted the 'primary cell', or Pcell, for a terminal device if it is the cell that is initially configured during connection setup for the terminal device. Thus the primary cell handles RRC (radio resource control) connection establishment/re-establishment for the terminal device. The primary cell is associated with a downlink component carrier and an uplink component carrier (CoC). These may sometimes be referred to herein as primary component carriers. A cell that is configured for use by the terminal device after initial connection establishment on the Pcell is termed a 'secondary cell', or Scell. Thus the secondary cells are configured after connection establishment on a primary cell to provide additional radio resources. The carriers associated with Scells may sometimes be referred to herein as secondary component carriers. Since in LTE up to five component carriers can be aggregated, up to four Scells (correspondingly associated with up to four secondary component carriers) can be configured for aggregation with the primary cell (associated with the primary component carrier). An Scell might not have both a downlink and uplink component carrier and the association between uplink component carriers and downlink component carriers is signaled in SIB2 on each downlink component carrier. The primary cell supports PDCCH and PDSCH on downlink and PUSCH and PUCCH on uplink whereas the secondary cell(s) support PDCCH and PDSCH on downlink and PUSCH on uplink, but not PUCCH. Measurement and mobility procedures are handled on the Pcell and the Pcell cannot be de-activated. The Scell(s) may be dynamically activated and deactivated, for example according to traffic needs, though MAC layer signaling to the terminal device. An Scell for a terminal device may also be deactivated automatically (time out) if the terminal device does not receive any transmission resource allocations on the Scell for a threshold amount of time.

Some aspects of physical layer control signaling for an LTE-based implementation of carrier aggregation based on the current standards are now described.

Each downlink component carrier has the normal LTE control channels: (E)PDCCH, PCFICH and PHICH. However, carrier aggregation introduces the possibility of so-called cross-carrier scheduling (XCS) on PDCCH. To support cross-carrier scheduling, a downlink control information (DCI) message on PDCCH includes a carrier indicator field (CIF) comprising three bits to indicate which of the component carriers the PDCCH message applies to. If there is no CIF, the PDCCH is treated as applying to the carrier on which it is received. A motivation for providing cross-carrier scheduling primarily applies for heterogeneous network (het-net) scenarios where overlaid macro- and small-cells may operate carrier aggregation in the same band. The effects of interference between the respective macro- and small-cells' PDCCH signaling can be mitigated by having the macro-cell transmit its PDCCH signaling on one component carrier at relatively high transmit power (to provide coverage across the macro-cell), while the small-cells use an alternative component carrier for their PDCCH scheduling.

The control region supporting PDCCH may differ in size (i.e. number of OFDM symbols) between component carriers, so they can carry different PCFICH values. However, the potential for interference in the control region in a het-net implementation may mean that PCFICH cannot be decoded on a particular component carrier. Therefore, current LTE standards allow for each component to carrier a semi-static indication of which OFDM symbol PDSCH can be assumed to begin in each subframe. If fewer OFDM symbols are actually used for the control region, the free/spare OFDM symbol(s) may be used for PDSCH transmissions to terminal devices which are not being cross-carrier scheduled as they will decode the actual PCFICH. If more OFDM symbols actually used for the control region, there will be some degree of performance degradation for the cross-carrier scheduled terminal devices.

PHICH signaling is sent on the downlink component carrier that sent the PDCCH signaling containing the PUSCH allocation to which the PHICH signaling relates. Accordingly, one downlink component carrier may carry PHICH for more than one component carrier.

In the uplink, the basic operation of PUCCH is not altered by the introduction of carrier aggregation. However, a new PUCCH format (format 3) is introduced to support the sending of acknowledgement signaling (ACK/NACK signaling) for multiple downlink component carriers, and with some alterations to format 1b to increase the number of ACK/NACK bits it can carry.

To assist good uplink channel sounding, SRS (sounding reference symbols) can be configured on any serving cell in accordance with specified operating rules regarding how signaling on PUSCH, PUCCH and SRS across multiple cells may be arranged to help ensure an appropriate priority for the various transmissions is achieved.

In current LTE-based carrier aggregation scenarios, primary and secondary synchronisation signaling (PSS and SSS) are transmitted on all component carriers using the same physical-layer cell identity (PCI) and component carriers are all synchronised with one another. This can help with cell search and discovery procedures. Issues relating to security and system information (SI) are handled by the Poe. In particular, when activating an Scell, the Pcell delivers the relevant SI for the Scell to the terminal device using dedicated RRC signaling. If the system information relating to a Scell changes, the Scell is released and re-added by Pcell RRC signaling (in one RRC message). Pcell changes, e.g. due to long-term fluctuations in channel quality across the Poe bandwidth, are handled using a modified handover procedure. The source Pcell passes all the relevant carrier aggregation (CA) information to the target Pcell so the terminal device can begin to use all the assigned component carriers when handover is complete.

Random access procedures are primarily handled on the uplink component carrier of Pcell for a terminal device, although some aspects of contention resolution signaling may be cross-carrier scheduled to another serving cell (i.e. an Scell).

As noted above, carrier aggregation is one approach for making use of unlicensed radio spectrum resources in wireless communication networks which are primarily designed to use licensed radio spectrum. In broad summary, a carrier aggregation based approach may be used to configure and operate a first component carrier (e.g. a primary component carrier associated with a Pcell in LTE terminology) within a region of the radio spectrum that has been licensed for use by a wireless telecommunications network, and to also configure and operate one or more further component carriers (e.g. a secondary component carrier associated with an Scell in LTE terminology) in an unlicensed region of the radio spectrum. The secondary component carrier(s) operating in the unlicensed region of the radio spectrum may do so in an opportunistic manner by making use of the unlicensed radio resources when they are available. There may also be provisions made for restricting the extent to which a given operator can make use of the unlicensed radio resources, for example by defining what might be referred to as politeness protocols.

Although known carrier aggregation schemes can form a basis for using unlicensed radio spectrum resources (or other forms of shared radio resources) in conjunction with licensed radio spectrum resources, some modifications to known carrier aggregation techniques may be appropriate to help optimise performance. This is because radio interference in the unlicensed radio spectrum can be expected to be subject to a wider range of unknown and unpredictable variations in time and frequency than might be seen within a region of the radio spectrum which has been licensed for use by a particular wireless applications system. For a given wireless telecommunications system operating in, accordance with a given technology, such as LTE-A, interference in the unlicensed radio spectrum may arise from other systems operating with the same technology, or systems operating according to different technologies, such as Wi-Fi, Bluetooth or global satellite navigation systems, GNSS.

Communications with a terminal device which take advantage of unlicensed spectrum operation can therefore be subject to unpredictable interference from other devices operating in the radio environment of the terminal device. In this regard, and as noted above, the other devices may be operating in accordance with the same radio access technology (e.g. they may be other terminal devices associated with another LTE network which is making use of the same unlicensed spectrum) and or they may be devices operating in the unlicensed spectrum in accordance with a different radio access technology, such as Wi-Fi, Bluetooth of GNSS (it be appreciated that in a GNSS context the terminal device will typically be communicating through reception without transmission).

In addition to inter-device interference issues, it is possible for interference issues to arise from a source within a terminal device itself. For example, it has become commonplace for terminal devices to be provided with wireless LAN (e.g. Wi-Fi), Bluetooth and satellite positioning functionality in addition to cellular-communication (e.g. LTE) functionality. The ability of a terminal device to reliably access radio resources for cellular communications can thus be impacted if the terminal device is also accessing radio resources for wireless communications associated with other radio access technologies, and vice versa. This kind of intra-device interference is sometimes referred to as in-device coexistence (IDC) interference/the IDC problem. In some respects IDC interference issues can be more severe than inter-device interference issues because of the immediate proximity of the transceiver circuitry associated with the different wireless radio access technologies in the terminal device.

The IDC problem has previously been considered in the context of conventional cellular communications operating on licensed bands adjacent to frequency bands comprising radio resources used by other potentially interfering radio access technologies. For example, in some geographic areas the radio band 2400-2483.5 MHz (the industrial, medical and scientific (ISM) band) is used for Wi-Fi and Bluetooth communications, while neighbouring bands, such as the 2300-2400 MHz band (Band 40 for TDD mode) and the 2500-2570 MHz band (Band 7 for FDD mode UL), are useful cellular communications. As a consequence, cellular communications in these bands can be prone to interference from Wi-Fi and Bluetooth communications in the adjacent ISM band. Global Navigation Satellite Systems (GNSS) can operate on various frequencies and cellular communications on frequencies around GNSS frequencies can likewise interfere with a terminal device's ability to operate a GNSS receiver.

More details on the issues associated with in-device coexistence interference and proposed solutions in the context of inter-band interference in an LTE wireless telecommunications system can be found in the technical documents associated with the relevant operating standards. For example, in the context of LTE-based networks, ETSI TR 136 816 V11.2.0 (2011 Dec.)/3GPP TR 36.816 version 11.2.0 Release 11 provides a study on signaling and procedures for interference avoidance for in-device coexistence; ETSI TS 136 300 V12.2.0 (2014 Jun.)/3GPP TS 36.300 version 12.2.0 Release 12 [8] sets out the adopted solutions to the IDC problem—see for example Section 23.4. In summary, the approach is for a terminal device to identify when DC problems arise in respect of frequencies which the terminal device is configured to measure (measurement objects) and which the terminal device cannot solve by itself and to send a corresponding IDC indication report to the network via dedicated RRC signaling to report the issue. In accordance with the current LTE standards, this report is sent as an InDeviceCoexIndication message in accordance with the approach set out in ETSI TS 136 331 V12.2.0 (2014 Jun.)/3GPP TS 36.331 version 12.2.0 Release 12 [6]—see Section 5.6.9 for an overview of the signaling and Section 6.2.2 for an overview of the message format. On receiving an InDeviceCoexIndication report indicating a potential problem for a terminal device, the network may then take appropriate action to seek to mitigate the issue. This may include, for example, handing over the terminal device's telecommunications to another carrier frequency, or configuring the terminal device for a time division duplex solution on the current carrier frequency.

Existing approaches for handling IOC issues do not consider the situation in which cellular communications may be undertaken on same frequencies (as opposed to adjacent frequencies) as other radio access technologies, for example in an LTE-U mode of operation. The inventor has recognised how modifications to existing approaches for handling IDC issues may be needed to optimise cellular communications using unlicensed radio spectrum in a device which also uses the unlicensed radio spectrum for wireless communications associated with other wireless access technologies, such as Bluetooth, WLAN (e.g. Wi-Fi) and GNSS.

Figure 4:
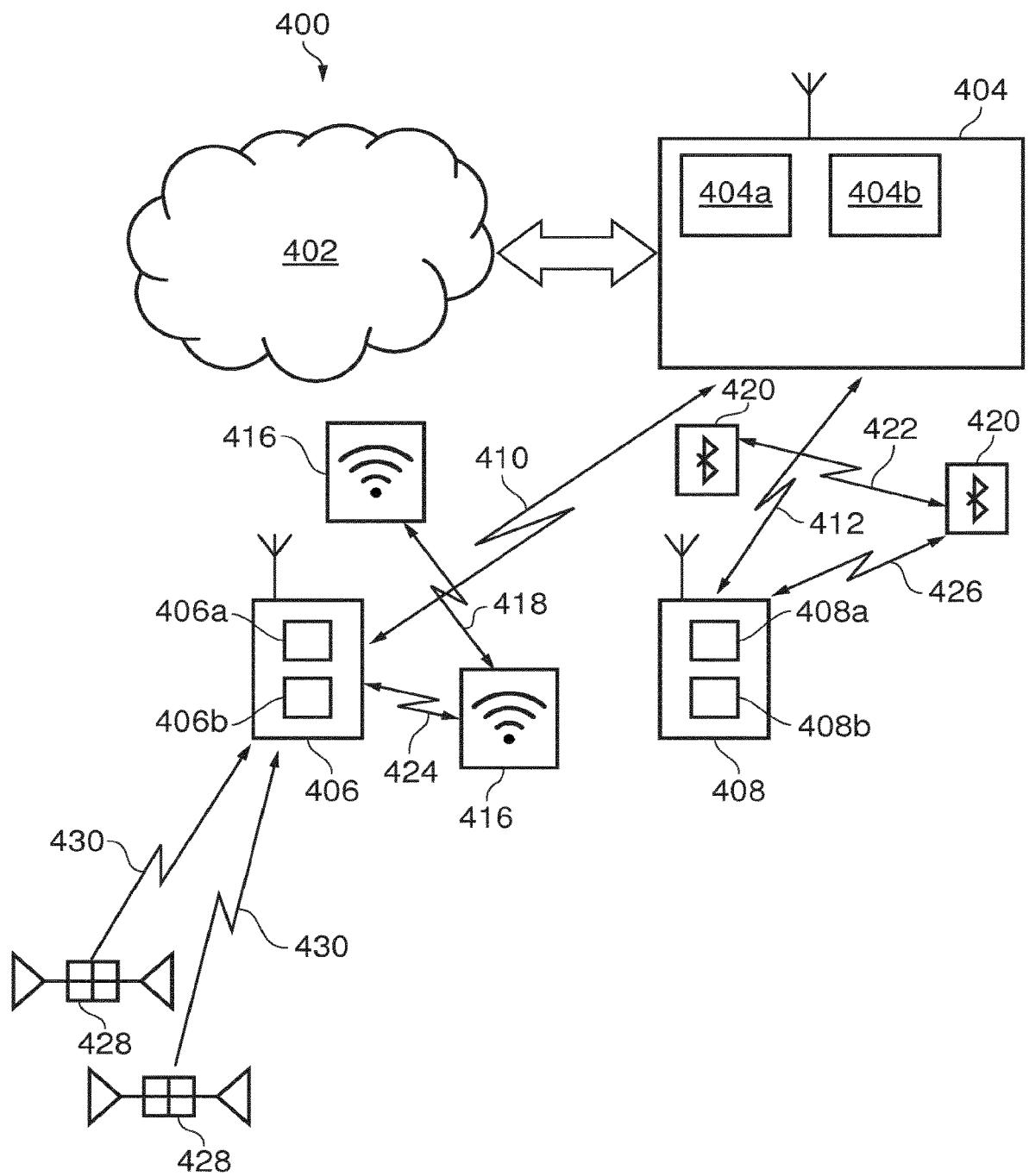
FIG. 4 schematically represents a wireless telecommunications system according to an embodiment of the disclosure.

FIG. 4 schematically shows a telecommunications system 400 according to an embodiment of the disclosure. The telecommunications system 400 in this example is based broadly on a LTE-type architecture. As such many aspects of the operation of the telecommunications system 400 are standard and well understood and not described here in detail in the interest of brevity. Operational aspects of the telecommunications system 400 which are not specifically described herein may be implemented in accordance with any known techniques, for example according to the established LTE-standards and known variations thereof.

The telecommunications system 400 comprises a core network part (evolved packet core) 402 coupled to a radio network part. The radio network part comprises a base station (evolved-nodeB) 404, a first terminal device 406 and a second terminal device 408. It will of course be appreciated that in practice the radio network part may comprise a plurality of base stations serving a larger number of terminal devices across various communication cells. However, only a single base station and two terminal devices are shown in FIG. 4 in the interests of simplicity.

Although not part of the cellular telecommunications system 400 itself, also shown, in FIG. 4 are some other devices which, are operable to wirelessly communicate with one another and which are operating within the radio environment of the telecommunications system 400. In particular, there is a pair of wireless access devices 416 communicating with one another via radio link 418 operating in accordance with a Wi-Fi standard and a pair of Bluetooth devices 420 communicating with, one another via radio link 422 operating in accordance with a Bluetooth, standard. These other devices represent a potential source of radio interference for the telecommunications system 400. It will be appreciated that in practice there will typically be many more such devices operating in the radio environment of the wireless telecommunications system 400, and only two pairs of devices 416, 420 are shown in FIG. 4 for simplicity.

As with a conventional mobile radio network, the terminal devices 406, 408 are arranged to wirelessly communicate data to and from the base station (transceiver station) 404. The base station is in turn communicatively connected to a serving gateway, S-GW, (not shown) in the core network part which is arranged to perform routing and management of mobile communications services to the terminal devices in the telecommunications system 400 via the base station 404. In order to maintain mobility management and connectivity, the core network part 402 also includes a mobility management entity (not shown) which manages the enhanced packet service, EPS, connections with the terminal devices 406, 408 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 402 to an external packet data network, for example the Internet. As noted above, the operation of the various elements of the communications system 400 shown in FIG. 4 may be broadly conventional apart from where modified to provide functionality in accordance with embodiments of the disclosure as discussed herein.

The terminal devices 406, 408 each comprise a transceiver unit 406a, 408a for transmission and reception of wireless signals and a controller unit 406b, 408b configured to control the operation of the respective devices 406, 408 in accordance with embodiments of the disclosure. The respective controller units 406b, 408b may each comprise a processor unit which is suitably configured programmed to provide the desired functionality described herein using conventional programming configuration techniques for equipment in wireless telecommunications systems. For each of the terminal devices 406, 408, their respective transceiver units 406a, 408a and controller units 406b, 408b are schematically shown in FIG. 4 as separate elements for ease of representation. However, it will be appreciated that for each terminal device the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminal devices 406, 408 will in general comprise various other elements associated with their operating functionality in accordance with established wireless telecommunications techniques (e.g. a power source, possibly a user interface, and so forth).

As has become commonplace in the field of wireless telecommunications, the terminal devices 406, 408 support radio communications in accordance with a plurality of different radio access technologies. For example, in addition to communicating wirelessly with the base station in accordance with a cellular communications radio access technology, such as LTE, the terminal devices 406, 408 may also communicate with other devices in accordance with other radio access technologies, such as wireless local area network radio access technologies (e.g. Wi-Fi), short distance radio access technologies (e.g. Bluetooth), and global navigation satellite system radio access technologies (e.g. GPS). Thus, the terminal devices 406, 408 represented in FIG. 4 support Wi-Fi, Bluetooth and GPS functionality in addition to cellular/mobile telecommunications functionality. Consequently, the respective terminal devices 406, 408 may also communicate with other devices operating in the network using non-cellular radio access technologies. Some examples of this non-cellular functionality is schematically represented in FIG. 4 with the first terminal device 406 communicating with one of the wireless access devices 416 over a wireless link 424 operating in accordance with a Wi-Fi radio access technology standard, the second terminal device communicating with one of the Bluetooth devices 420 over a wireless link 426 operating in accordance with a Bluetooth radio access technology standard, and with the first terminal device 406 receiving global positioning satellite signaling from a plurality of global positioning satellites 428 over corresponding wireless links 430 operating in accordance with a global positioning satellite system radio access technology.

Thus the transceiver units 406a, 408a of the respective terminal devices may comprise functional modules operable according to different wireless communications operating standards. For example, the terminal devices' transceiver units may each comprise an LTE transceiver module for supporting wireless communications in accordance with an LTE-based operating standard, a Wi-Fi transceiver module for supporting wireless communications in accordance with a MAN operating standard, a Bluetooth transceiver module for supporting wireless communications in accordance with a Bluetooth operating standard, and a GPS transceiver module for supporting wireless communications in accordance with a GNSS operating standard. It will be appreciated the GPS transceiver module will generally be restricted to receive functionality, but is nonetheless referred to here as a transceiver module for convenience of terminology. The underlying functionality of the different transceiver modules may be provided in accordance with conventional techniques. For example, a terminal device may have separate hardware elements to provide the functionality of each transceiver module, or alternatively, a terminal device might comprise at least some hardware elements which are configurable to provide some or all functionality of multiple transceiver modules. Thus the transceiver units 406a, 408a of the terminal devices 406, 408 represented in FIG. 4 are assumed here to provide the functionality of an LTE transceiver module, a Wi-Fi transceiver module, a Bluetooth transceiver module and a GPS transceiver module in accordance with conventional wireless communications techniques.

The base station 404 comprises a transceiver unit 404a for transmission and reception of wireless signals and a controller unit 404b configured to control the base station 404. The controller unit 404b may comprise a processor unit which is suitably configured/programmed to provide the desired functionality described herein using conventional programming/configuration techniques for equipment in wireless telecommunications systems. The transceiver unit 404a and the controller unit 404b are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 404 will in general comprise various other elements associated with its operating functionality. For example, the base station 404 will in general comprise a scheduling entity responsible for scheduling communications. The functionality of the scheduling entity may, for example, be subsumed by the controller unit 404b.

Thus, the base station 404 is configured to communicate data with the first and second terminal devices 406, 408 over respective first and second radio communication links 410, 412. The wireless telecommunications system 400 supports a carrier aggregation mode of operation in which the first and second radio communication links 410, 412 each comprise a wireless access interface provided by multiple component carriers. For example, each radio communication link may comprise a primary component carrier and one or more secondary component carriers. Furthermore, the elements comprising the wireless telecommunications system 400 in accordance with this embodiment of the disclosure are assumed to support carrier aggregation in an unlicensed spectrum mode. In this unlicensed spectrum mode the base station communicates with terminal devices using a primary component carrier operating on radio resources within a first frequency band that has been licensed for use by the wireless telecommunications system and one or more secondary component carriers operating on radio resources within a second frequency band that has not been licensed for exclusive use by the wireless telecommunications system. The first frequency band may sometimes be referred to herein as a licensed frequency band and the second frequency band may sometimes be referred to herein as an unlicensed (U) frequency band. In the context of an LTE-based wireless telecommunications system, such as that represented in FIG. 4, operation in the unlicensed frequency band may be referred to as an LTE-U mode of operation. The first (licensed) frequency band may be referred to as an LTE band (or more particularly an LTE-A band) and the second (unlicensed) frequency band may be referred to as an LTE-U band. Resources on the LTE-U band may be referred to as U-resources. A terminal device able to make use of U-resources may be referred to as a U-terminal device (or U-UE). More generally, the qualifier "U" may be used herein to conveniently identify operations in respect of the unlicensed frequency band.

It will be appreciated that the use of carrier aggregation techniques and the use of unlicensed spectrum resources (i.e. resources that may be used by other devices without centralised coordination) in accordance with embodiments of the disclosure may be based generally on previously proposed principles for such modes of operation, for example as discussed above, but with modifications as described herein to provide additional functionality in accordance with embodiments of the present disclosure. Accordingly, aspects of the carrier aggregation and unlicensed spectrum operation which are not described in detail herein may be implemented in accordance with known techniques.

Modes of operation for the wireless telecommunications network 400 represented in FIG. 4 in accordance with certain embodiments of the disclosure will now be described. The general scenario for these embodiments is assumed to be one in which a carrier aggregation capable terminal device is operating in an LTE-A cell as normal, and the base station determines that it should configure the LTE-U' capable terminal device with an additional aggregated carrier using LTE-U resources. The specific reason why the base station determines that it should configure a particular terminal device for LTE-U based carrier aggregation is not significant. Thus the LTE-A carrier provides a Pcell for the terminal device and the LTE-U resources provide one or more Scell(s) for the terminal device. It will be appreciated the LTE-A resources may also be used to provide component carriers associated with one or more further Scells(s) in accordance with conventional carrier aggregation techniques. For the examples described with reference to FIG. 4, the LTE-A transmissions in the licensed frequency band and the LTE-U transmissions in the unlicensed frequency band, and thus the Pcell and Scell(s), are both made from the same base station 404, but this may not be the case in other example embodiments. The LTE-U carrier could in general be utilised with a TDD (time division duplex) or FDD (frequency division duplex) frame structure. However, a consequence of some aspects of existing regulatory restrictions on unlicensed spectrum usage in some regions means that TDD or downlink-only FDD operation may, at least currently, be more likely.

Figure 5:
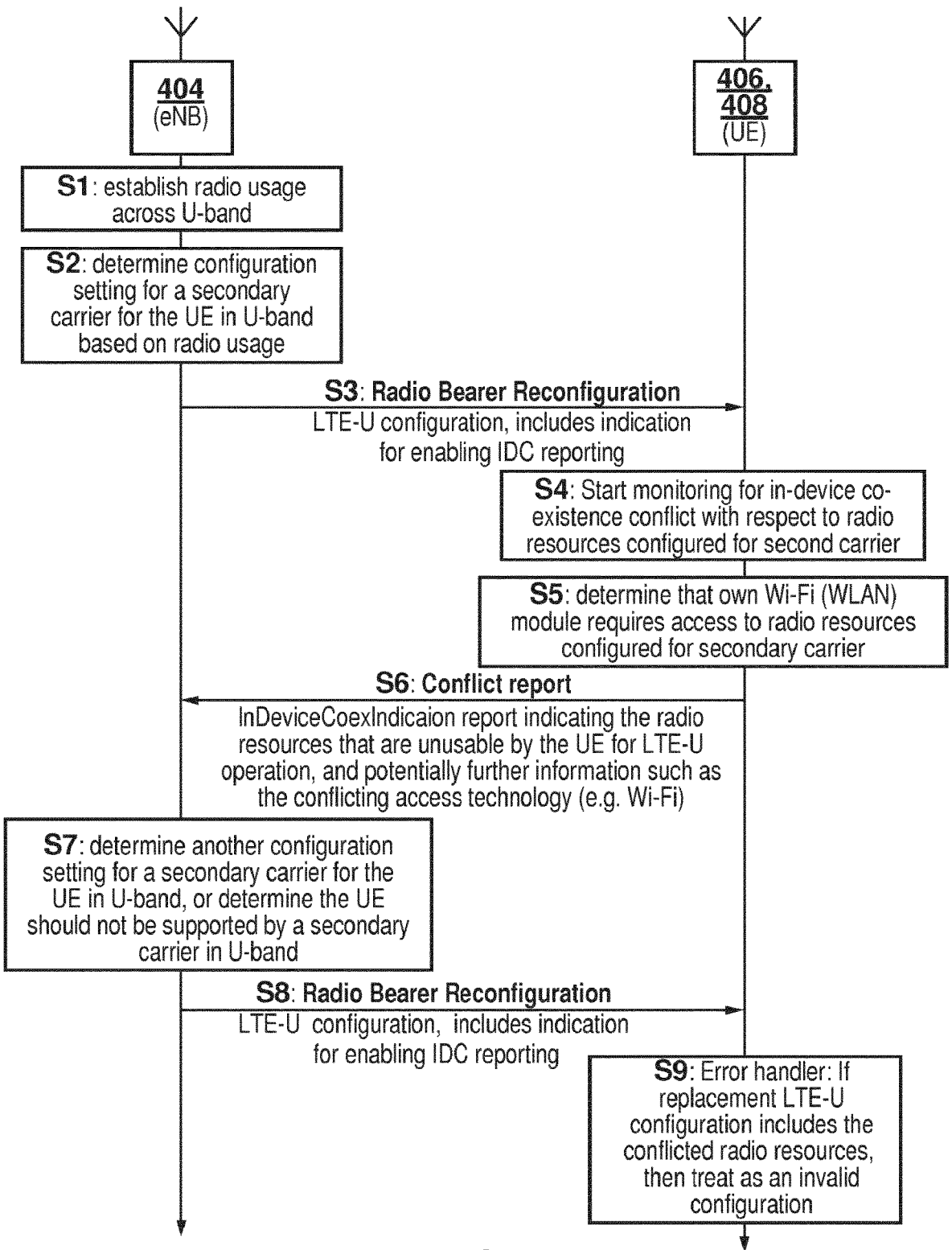
FIG. 5 is a signaling ladder diagram representing some operating aspects of a base station and a terminal device in accordance with some embodiments of the disclosure.

FIG. 5 is a signaling ladder diagram schematically representing modes of operation for one of the terminal devices (UEs) 405, 459 and the base station (eNB) 404 schematically represented in FIG. 4 in accordance with certain embodiments of the present disclosure. The operation is for supporting communications between the base station and the terminal device in accordance with a first radio access technology (e.g. an LTE-based radio access technology) using a primary component carrier (associated with a primary cell) operating on radio resources within a first frequency band and a secondary component carrier (associated with a secondary cell) operating on radio resources within a second frequency band in accordance with certain embodiments of the present disclosure. As discussed above, the first frequency band is taken to correspond with resources that have been licensed for dedicated use by the operator of the wireless telecommunications system 400 for cellular communications, whereas the second frequency band is taken to correspond with resources that are shared by other wireless communication technologies which the terminal device may support.

In broad summary, some embodiments of the disclosure introduce the concept of a terminal device determining if there is an overlap (conflict) between radio resources configured by the base station for communicating with the terminal device and radio resources which the terminal device wishes to use for communicating in accordance with another radio access technology, and reporting to the base station if there is an overlap. The base station may then respond by selecting a new configuration of radio resources for communicating with the terminal device, and transmitting this to the terminal device, as discussed further below.

Processing in accordance with certain embodiments of the disclosure as schematically represented in FIG. 5 is shown starting from a stage at which the terminal device is configured for operation on the primary cell associated with the primary carrier, but is not yet configured for operation on the secondary cell associated with the secondary carrier. This may be, for example, because the terminal device has only just connected to the primary cell or because a previous secondary cell configuration is no longer valid. It is also assumed in this example the UE is not wirelessly communicating with any other devices using its Bluetooth or GPS functionality at the start of the processing represented in FIG. 5, but this is not of particular significance.

In step S1 the base station establishes a measure of radio usage in the second frequency band. In some example implementations the base station may itself measure radio usage at different frequencies across the second frequency band, but in this example it is assumed the terminal device makes these measurements and reports them to the base station. That is to say, in this example implementation the base station establishes radio usage across the second band (unlicensed band) from reports received from the terminal device (and/or other terminal devices operating in the wireless telecommunications system). This information can help the base station determine whether, and if so how, a secondary component carrier might be configured for to support cellular communications with the terminal device in the unlicensed frequency band.

Thus, the terminal device makes measurement of radio usage in the second frequency band in its environment. In particular, the terminal device measures the degree of radio usage at different frequencies across the second frequency band. For example, the terminal device may use its WLAN transceiver module to scan for activity associated with other wireless communication devices, for example, Wi-Fi access points. From this the terminal device may establish, for example, an indication of frequency resources used by other wireless communications devices and or an indication of a received signal strength for wireless communications associated with other wireless communications devices and/or an indication of an identifier for the other wireless communications device (e.g. SSID). The terminal device may also scan for radio usage in the second frequency band by other devices operating according to other operating standards, for example Bluetooth and or other LTE networks. In some embodiments the terminal device might not separately measure radio usage by different technologies, but may simply measure an aggregate level of radio signals (which may include radio noise) in its environment at different frequencies across the second frequency band. The terminal device then transmits an indication of the measurements of radio usage at different frequencies across the second frequency band to the base station. This may be done on uplink radio resources on the already-configured primary cell to which the terminal device is connected in accordance with conventional signaling techniques, for example in accordance with the established principles of measurement report RRC signaling. Based on the measurement information regarding radio usage in the second frequency band received from the terminal device, the base station establishes radio usage across the secondary band in step S1 represented in FIG. 5.

In Step S2, the base station determines a configuration setting for the secondary component carrier based on the radio usage in the second frequency band established in step S1. For example, the configuration setting may define transmission resources (e.g. in terms of time and/or frequency resources) selected from within the second frequency band to use for the secondary component carrier. The base station may determine appropriate transmission resources for the secondary cell configuration from the received measurements of radio usage in accordance with any established techniques for selecting appropriate transmission resources to use in a competitive (opportunistic) radio environment based on measurements of existing usage. For example, the base station may seek to avoid configuring radio resources in regions of the second frequency band for which the terminal device measurement reports indicate a relatively high degree of radio usage, and may instead preferentially select a configuration for the secondary carrier that makes use of radio resources in spectral regions having a relatively low degree of radio usage.

In general, the process of determining an appropriate configuration setting (e.g. determining an appropriate carrier frequency) for a secondary carrier for supporting cellular communications with a terminal device in a portion of the radio spectrum which is also used by other radio access technologies (i.e. radio access technologies which are different from cellular radio access technologies) may be performed in accordance with any previously proposed techniques.

In step S3 the base station transmits an indication of the chosen configuration setting for the secondary carrier to the terminal device. This may be done on downlink radio resources on the already-configured primary cell in accordance with conventional signaling techniques, for example in accordance with the established principles of radio bearer (re)configuration message RRC signaling. In accordance with certain embodiments of the disclosure, the indication of the chosen configuration setting for the secondary carrier may be associated with an indication for enabling in-device coexistence (IDC) reporting in accordance with embodiments of the disclosure. In some implementations this may comprise a dedicated flag which may be set by the base station to actively indicate whether or not DC reporting should be undertaken by the terminal device in respect of the relevant configuration. The flag may be conveyed, for example, in a new information element defined for radio bearer reconfiguration signaling of the type used in step S3. In other implementations, the triggering of IDC reporting in respect of the configured radio resources associated with the signaling step S3 may be implicit, for example, simply receiving a conventional radio bearer reconfiguration message in respect of radio resources associated with a predefined portion of the radio spectrum (corresponding to the unlicensed portion of the radio spectrum) may be interpreted by the terminal device as an indication for enabling IDC reporting in accordance with certain embodiments of the disclosure as described further below. In this respect, the terminal device may in effect be configured to establish a measurement object in respect of the radio resources configured for supporting the secondary carrier in response to receiving the indication for enabling IDC reporting in step S3. That is to say, the terminal device may determine that the relevant radio resources should be monitored without necessarily receiving a specific measurement configuration setting identifying the resources as a measurement object.

In response to receiving the signaling configuring the secondary carrier in step S3, the terminal device configures its transceiver unit (and in particular the LTE transceiver module component of its transceiver unit) in accordance with the configuration setting information received from the base station, for example by appropriate tuning of the transceiver circuitry. This may be formed in accordance with conventional techniques for radio bearer configuration setting. The base station may then start communicating with the terminal device using the primary carrier and the secondary carrier configured in accordance with the latest configuration setting for the secondary component carrier. This may be done based on established carrier aggregation techniques and using previously-proposed techniques for making use of unlicensed frequency spectrum. This potentially ongoing cellular communication aspect of the operation is not represented in FIG. 5.

In step S4 the terminal device begins monitoring for in-device coexistence conflict with respect to the radio resources configured for the second carrier and the resources which the terminal device wishes to use for communicating in accordance with another radio access technology, for example Wi-Fi. That is to say, having received from the base station an indication of a configuration of radio resources within the second frequency band for use by the terminal device for communications with the base station in accordance with a first radio access technology (i.e. LTE cellular communications in this example), the terminal device establishes a configuration of radio resources within the second frequency band for use by the terminal device for communications in accordance with a second radio access technology (e.g. Wi-Fi). The configuration of resources to be used for Wi-Fi communications may be established in accordance with conventional techniques. The monitoring of step S4 corresponds with the terminal device determining, on an ongoing basis, whether there is an overlap in the radio resources configured for use by the terminal device for communications in accordance with the first radio access technology (i.e. the radio resources configured for supporting the secondary carrier) and the radio resources configured for use by the terminal device for communications in accordance with the second radio access technology (i.e. the radio resources the terminal device needs for Wi-Fi communications). The monitoring of Step S4 may be performed in accordance with a monitoring schedule corresponding to that used for conventional inter-frequency IOC monitoring.

In the processing represented in FIG. 5 it is assumed that in step S5 the terminal device determines there is an overlap (conflict) in respect of the radio resources configured for use by the secondary carrier and the radio resources which the terminal devices own Wi-Fi module requires for Wi-Fi communications.

That is to say, the terminal device determines that the radio resources currently configured for supporting the secondary carrier are also needed for supporting Wi-Fi communications (it will be appreciated this example is described in the context of competing Wi-Fi communications, but the same principles apply for Bluetooth and GPS communications, or more generally, for any communications in accordance with any radio access technology supported by the terminal device which is different from the radio access technology used for communications with the base station on the secondary carrier).

In step S6 the terminal device sends an overlap/conflict report to the base station to indicate the existence of the overlap. This may be sent on uplink radio resources associated the primary carrier. In accordance with certain embodiments this conflict report may generally conform to an existing format for reporting inter-frequency IDC interference issues, for example in accordance with the principles set out in [6], [7] and [8]. In an LTE context, an InDeviceCoexIndication message format is defined for reporting inter-frequency IDC interference issues. In this regard, a conventional InDeviceCoexIndication message can only provide feedback in respect of frequencies which have been configured as measurement objects for the terminal device. Furthermore, there is a limited amount of information which the terminal device can convey to the base station with a conventional InDeviceCoexIndication message. For example, the terminal device can indicate the frequency subject to inter-frequency IDC and the direction of interference (i.e. whether the LTE communications are causing interference or are being interfered with, or both). Therefore, in accordance with certain embodiments of the disclosure it is proposed to introduce a new information element to the existing InDeviceCoexIndication message format to indicate whether radio resources configured for the secondary carrier are associated with an overlap with radio resources needed for communicating in accordance with a non-cellular radio access technology. That is to say, the terminal device may be configured to configure an InDeviceCoexIndication message with an entry associated with the configured secondary carrier with a corresponding information element which is set to one value to indicate no overlap and another value to indicate overlap. In this regard, the signaling transmitted to the network to indicate there is an overlap may comprise radio resource control, RRC, signaling. However, it will be appreciated there are many different ways in which an indication of the overlap/conflict may be reported to the network in accordance with other embodiments of the disclosure, and some examples of these are described further below.

In step S7, having received the indication of the overlap from the terminal device in step S6, the base station determines a replacement configuration setting for the secondary component carrier. Step S6 may be performed largely in the same way as step S2 described above, but in addition to taking account of measurements of radio usage across the second (unlicensed/shared) frequency band, the base station also takes account of the overlap report received from the terminal device, and in particular avoids configuring any of the radio resources in respect of which the overlap is indicated in the replacement configuration setting established in step S7.

In the processing represented in FIG. 5, it is assumed the base station is able to determine an appropriate replacement configuration setting for the secondary carrier. However, in some cases it may be that the overlap and/or current radio usage across the unlicensed frequency band prevents the base station from determining an appropriate replacement configuration. For example, if there is only a limited number of potential configurations available for the secondary carrier and these are all inappropriate because of the overlap with radio resources needed by the terminal device to support its non-cellular communications, the base station may determine that it is unable to configure the terminal devices for secondary carrier operation at the present time.

In this case, the base station may simply indicate to the terminal device that the previously-received configuration setting in step S3 is to be considered no longer valid without seeking to provide a replacement configuration. This may be done by sending conventional release signaling.

However, in the processing of FIG. 5 it is assumed the base station is able to determine an appropriate replacement configuration in step S7, and in step S8 the base station transmits an indication of the chosen replacement configuration setting for the secondary carrier to the terminal device. This step that may be performed in the same manner as described above in respect of step S3 for the previously-determined configuration setting.

In step S9 the terminal device determines if the replacement configuration for the secondary carrier includes radio resources in respect of which the terminal device indicated there was an overlap in step S6.

If it does not, the terminal device may proceed to operate normally as described above. That is to say, the terminal device may undertake communications as necessary, while also continuing to monitor for the occurrence of an overlap in the radio resources currently configured for supporting the secondary carrier for cellular communications with the base station, and the radio resources that are needed for communicating in accordance with a different radio access technology. It will be appreciated the radio resources needed for communicating in accordance with the other radio access technologies, such as Wi-Fi, Bluetooth and GPS, may change with time according to the terminal device's current activities. For example, at some point in time the terminal device may not be undertaking any Wi-Fi communications, whereas at other points in time it may be undertaking Wi-Fi communications. Furthermore, if the terminal device may switch from being connected to one Wi-Fi access point to being connected to another Wi-Fi access point, and accordingly there may be a change in the configuration of radio resources needed for supporting Wi-Fi communications which may give rise to an overlap with an existing configuration of radio resources for cellular communications.

However, if in step S9 it is determined that the replacement configuration received from the base station in step S8 includes radio resources that the terminal device has previously indicated are subjects to overlap, the terminal device may be configured to treat the configuration received in step S8 as being an invalid configuration. That is to say, the terminal device may react in the same way as if it had been instructed to adopt a configuration which it was not capable of adopting in accordance with its capabilities. For example, the terminal device may revert to a radio resource control, RRC, idle mode in respect of the secondary component carrier in such an event. In another implementation, the terminal device may simply send another conflict report in respect of the replacement configuration corresponding to the signaling sent in step S6 in respect of the previous configuration.

Thus, the processing represented in FIG. 5 provides a scheme for allowing a terminal device to indicated to a base station that a current-configuration of radio resources for supporting a secondary component carrier in a region of the spectrum that may be used by the terminal device for communicating in accordance with another radio access technology cannot be used for supporting the secondary carrier.

It will be appreciated there are many variations of the processing represented in FIG. 5 that can be adopted in accordance with different implementations of embodiments of the disclosure.

For example, rather than introduce a new information element into an existing InDeviceCoexIndication message format, a current field of an existing InDeviceCoexIndication message format may be repurposed to provide an indication of overlap in respect of radio resources with which corresponding entry in the InDeviceCoexIndication message relates. For example, in an LTE context, there is currently an unused (i.e. spare) value available in the information element relating to the interference direction field of the existing InDeviceCoexIndication message format. In accordance with some embodiments of the disclosure, this value may be selectively set by the terminal device to indicate the radio resources to which the corresponding entry in the InDeviceCoexIndication message relates are subject to overlap with resources that the terminal device is seeking to use for communicating in accordance with another wireless access technology.

In other example implementations, the report signaling transmitted in step S6 of the processing represented in FIG. 5 may not be sent as an an aspect of an InDeviceCoexIndication message using RRC signaling. For example, a dedicated signaling format may be established for conveying this information. Alternatively, an existing reporting process may be re-purposed to provide an indication of overlap. For example, the terminal device may be configured to provide CQI reporting in respect of the secondary carrier currently configured by the base station and a CQI value may be predefined to correspond with an indication of overlap in respect of the relevant radio resources. Thus, a terminal device may provide CQI reports in respect of the configured secondary carrier in the usual way until it is determined that there is a conflict/overlap with the terminal device's needs for using the relevant radio resources for communicating in accordance with another radio access technology, and in this case may provide a CQI report conveying a CQI value which is predefined as being for use when indicating the radio channel is unusable because of the overlap. The relevant CQI value to use to indicate overlap may be specified in accordance with a standard of the wireless communications system, or established in prior communications between the base station and terminal device. This approach may in some cases provide faster feedback as there is no need for the RRC signaling overhead associated with an InDeviceCoexIndication message.

It will be appreciated the report indicating the existence of a radio resource conflict/overlap may further convey additional information to the base station which may be useful in helping the base station establish an appropriate updated configuration setting. For example, the report may also indicate the nature of the radio access technology for which the radio resources are overlapping with the radio resources configured for supporting the secondary carrier and the unlicensed band. For example, the report may indicate that the overlap is in respect of wireless local area network communications, or Bluetooth communications, or GPS receiver communications. Because it can be expected the different types of communications have different operating profiles, for example in terms of bandwidth and the likely duration of an identified overlap, this kind of additional information may in some circumstances assist the base station in selecting an appropriate re-configuration for the secondary carrier radio resources.

The processing represented in FIG. 5 is based on an approach in which the base station provides the terminal device with a single current configuration setting for the secondary carrier. However, there have been proposed approaches in which a plurality of potential configuration settings are established for a single secondary carrier. This can allow the base station to more rapidly switch between configuration settings, for example in response to changing radio conditions on the unlicensed radio band. An example of this approach is set out in co-pending application EP14171284.4 [9] filed on 5 Jun. 2014, the entire contents of which are incorporated herein by reference. In broad summary, in an example of this kind of approach a terminal device and network infrastructure equipment in a wireless telecommunications system communicate on a primary cell supporting a primary component carrier on radio resources within a first frequency band and a secondary cell supporting a secondary component carrier on radio resources within a second frequency band. The infrastructure equipment establishes a plurality of configuration settings for the secondary carrier (e.g. in terms of frequency and or time resources) based on measurements of radio usage in the second frequency band. The configuration settings (which may in some respects be viewed as semi-static secondary cell pre-configurations) are conveyed to the terminal device. The terminal device makes channel quality measurements for the secondary component carrier according to the different configuration settings and reports these to the infrastructure equipment. Based on these measurements of channel quality for the different configurations of the secondary carrier, the infrastructure equipment selects one of the configuration settings, and conveys an indication of this to the terminal device in association with an allocation of transmission resources on the secondary component carrier. Data is then transmitted from the infrastructure equipment to the terminal device using the allocated resources on the secondary component carrier with the secondary component carrier operating in accordance with the selected configuration.

Thus, in some implementations processing steps corresponding to steps S2 and S3 of FIG. 5 may be associated with multiple potential configuration settings. In this case, the terminal device may be configured to determine whether any of the potential configuration settings are subject to overlap with the radio resources which the terminal device is to use for other communications, and if so to provide a conflict report similar to that discussed above, but further indicating which of the potential configuration settings the overlap applies to.

In accordance with some previously proposed approaches a configuration setting for a secondary carrier in a unlicensed band may be associated with a validity period and may be assumed valid until the validity period expires. An example of this approach is set out in co-pending application EP14171285.1 [10] filed on 5 Jun. 2014, the entire contents of which are incorporated herein by reference. In broad summary, a terminal device and a base station in a wireless telecommunications system communicate with one another using a primary component carrier operating on radio resources within a first frequency band and a secondary component carrier operating on radio resources within a second frequency band. The terminal device makes measurements of radio usage in the second frequency band, e.g. by other devices which are not part of the wireless telecommunications system but which can also use radio resources within the second frequency band. The terminal device transmits an indication of the measurements to the base station, and on the basis of this the base station establishes a configuration setting for the secondary component carrier, for example in terms of frequency resources to use for the secondary component carrier. The configuration setting is associated with a validity period during which the base station communicates data to the terminal device using the primary component carrier and the secondary component carrier operating in accordance with its configuration setting. When the validity period expires, the terminal device again measures and reports on radio usage so the base station can determine an updated configuration setting for the secondary component carder that takes account of any changes in radio usage during the validity period. This kind of approach may be adopted in accordance with certain embodiment of the present disclosure, whereby the identification of an overlap represents a trigger for assuming the validity period should be curtailed/cut short. More generally, the terminal device may respond to the identification of an overlap by releasing the configuration for the carrier in respect of which the overlap is identified.

In the examples described above, the base station establishes a measure of radio usage in the second frequency band in step S1 from reports received from terminal devices operating in the wireless telecommunications system. In this regard, and in addition to or instead of the terminal devices reporting on radio usage in their surroundings (radio environment), the terminal devices may be configured to report to the base station information regarding their respective use (or intended use) of radio resources within the second frequency band for communicating in accordance with other radio access technologies. The base station may then take this into account when establishing a configuration in a step corresponding to step S2, for example by avoiding configuring radio resources for use by a terminal device which has indicated a need to use these radio resources for communicating in accordance with a different radio access technology.

It will be appreciated that while the above-described embodiments are focused on a single base station supporting both the primary component carrier the secondary component carrier, more generally these could be transmitted from separate base stations. In this regard, the network-side processing in accordance with embodiments of the present disclosure may be performed by network infrastructure equipment which comprises, for example, one base station or more than one base station, and potentially other network infrastructure equipment elements according to the operating principles of the wireless telecommunications network in which the approach is implemented.

It will be appreciated the principles described above may be applied in respect of a wireless telecommunications system supporting carrier aggregation with secondary component carriers operating in a frequency band over which the wireless telecommunications system does not have exclusive control irrespective of whether or not the wireless telecommunications system requires an administrative license to operate in the secondary frequency band. That is to say, it will be appreciated the terminology "unlicensed" is used herein for convenience to refer to operation in a band over which the wireless telecommunications system does not have exclusive access. In many implementations this will correspond with a license exempt frequency band. However, in other implementations the operation may be applied in a frequency band which is not unlicensed in the strict administrative sense, but which is nonetheless available for shared opportunistic use by devices operating according to different wireless access technologies (e.g. LTE-based, Wi-Fi-based and/or Bluetooth-based technologies) and or multiple networks operating according to the same technology (e.g. LTE-based wireless communication systems provided by different network operators). In this regard the terminology such as "unlicensed frequency band" may be considered to refer generally to a frequency band in which resources are shared by different wireless communications systems. Accordingly, while the term "unlicensed" is commonly used to refer to these types of frequency bands, in some deployment scenarios an operator of a wireless telecommunications system may nonetheless be required to hold an administrative license to operate in these frequency bands. Operation of the kind described herein is sometimes referred to as being License Assisted Access (LAA) as opposed to being unlicensed. For example, the term LTE-LAA may be used in place of LTE-U, and so on. This terminology reflects the nature of the operation in using communications on frequencies which are licensed for use by an operator to assist access on other frequencies which are not exclusively licensed for use by the operator.

Thus there has been described a terminal device and network infrastructure equipment that communicate in accordance with a first radio access technology on a primary cell supporting a primary component carrier on radio resources within a first frequency band and a secondary cell supporting a secondary component carrier on radio resources within a second frequency band. The terminal device is also operable to use radio resources within the second frequency band for communicating in accordance with a second radio access technology, e.g. Wi-Fi. The network infrastructure equipment establishes a configuration of radio resources (a channel) within the second frequency band for use by the terminal device for communications with the network infrastructure equipment in accordance with the first radio access technology and communicates an indication of this to the terminal device (i.e. a configuration for the secondary component carrier). The terminal device establishes a configuration of radio resources (a channel) for use by the terminal device for communications in accordance with the second radio access technology and determines if there is any overlap in the radio resources configured for use by the two different radio access technologies, and if so communicates an indication of this to the network infrastructure equipment. For example, the indication of the overlap may correspond with an indication that the radio resources within the second frequency band configured for use by the terminal device for communications with the network infrastructure equipment in accordance with the first radio access technology comprises a configuration which is not supported by the terminal device (at least for the time being, i.e. for so long as the overlap situation remains). In response the network infrastructure equipment establishes a replacement configuration of radio resources for communications with the terminal device in accordance with the first radio access technology, wherein the replacement configuration avoids the radio resources indicated as being subject to overlap, and transmits an indication of the replacement configuration to the terminal device.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a terminal device in a wireless telecommunications system for communicating with network infrastructure equipment in accordance with a first radio access technology on a primary cell supporting a primary component carrier on radio resources within a first frequency band and a secondary cell supporting a secondary component carrier on radio resources within a second frequency band, wherein the terminal device is also operable to use radio resources within the second frequency band for communicating in accordance with a second radio access technology, wherein the method comprises: receiving from the network infrastructure equipment an indication of a configuration of radio resources within the second frequency hand for use by the terminal device for communications with the network infrastructure equipment in accordance with the first radio access technology; establishing a configuration of radio resources within the second frequency band for use by the terminal device for communications in accordance with the second radio access technology; determining if there is an overlap in the radio resources configured for use by the terminal device for communications in accordance with the first radio access technology and the radio resources configured for use by the terminal device for communications in accordance with the second radio access technology, and if so, transmitting signaling to the network infrastructure equipment to indicate there is an overlap.

Paragraph 2. The method of any of paragraphs 1 to, further comprising receiving from the network infrastructure equipment an indication of an updated configuration of radio resources within the second frequency band for use by the terminal device for communications with the network infrastructure equipment in accordance with the first radio access technology in response to transmitting the signaling to the network infrastructure equipment to indicate there is an overlap.

Paragraph 3. The method of paragraph: 2, further comprising determining if the radio resources associated with the updated configuration includes radio resources in respect of which the indication of the overlap is transmitted to the network infrastructure equipment, and if so, classifying the updated configuration as an invalid configuration or as an unsupported configuration.

Paragraph 4. The method of paragraph 2 or 3, further comprising determining if the radio resources associated with the updated configuration includes radio resources in respect of which the indication of the overlap is transmitted to the network infrastructure equipment, and if so, reverting to a radio resource control, RRC, idle mode in respect of the secondary component carrier.

Paragraph 5. The method of any of paragraphs 1 to 4, further comprising receiving from the network infrastructure equipment an indication that the configuration of radio resources within the second frequency band for use by the terminal device for communications with the network infrastructure equipment in accordance with the first radio access technology is no longer valid.

Paragraph 6. The method of any of paragraphs 1 to 5, wherein the signaling to the network infrastructure equipment to indicate there is an overlap is associated with an indication of the radio resources in respect of which the overlap applies.

Paragraph 7. The method of any of paragraphs 1 to 6, wherein the terminal device is operable to use radio resources within the second frequency band for communicating in accordance with a number of different radio access technologies which are different to the first radio access technology, and wherein the signaling to the network infrastructure equipment to indicate there is an overlap further comprises an indication of the second radio access technology in respect of which the overlap has been determined.

Paragraph 8. The method of any of paragraphs 1 to 7, wherein the signaling transmitted to the network infrastructure equipment to indicate there is an overlap comprises radio resource control, RRC, signaling.

Paragraph 9. The method of any of paragraphs 1 to 8, wherein the terminal device is operable to transmit signaling to the network infrastructure equipment to indicate a potential for inter-frequency interference arising between different frequencies associated with different radio access technologies supported by the terminal device using an inter-frequency in-device coexistence, IDC, message having a predefined format, and wherein the signaling transmitted to the network infrastructure equipment to indicate there is an overlap conforms to the inter-frequency in-device coexistence, IDC, message format.

Paragraph 10. The method of paragraph 9, wherein the signaling transmitted to the network infrastructure equipment to indicate there is an overlap comprises a message conforming to the predefined inter-frequency in-device coexistence, IDC, message format with an information element selectively set to a value to indicate whether or not there is an overlap in respect of radio resources identified in the message.

Paragraph 11. The method of paragraph 10, wherein the information element is dedicated to the purpose of indicating whether or not there is an overlap in respect of radio resources identified in the message.

Paragraph 12. The method of paragraph 10, wherein the information element is associated with indicating an aspect of potential inter-frequency interference arising between different frequencies associated with different radio access technologies supported by the terminal device, and in the case of overlap is set to a value which is different from the values used when the information element is used to indicate an aspect of potential inter-frequency interference.

Paragraph 13. The method of paragraph 12, wherein the aspect of potential inter-frequency interference with which the information element is associated in accordance with the predefined inter-frequency IOC message format is an indication of the direction of interference between the different radio access technologies.

Paragraph 14. The method of any of paragraphs 1 to 13, wherein the signaling transmitted to the network infrastructure equipment to indicate there is an overlap comprises a channel quality indicator, CQI, message in respect of the radio resources configured for use by the terminal device for communications in accordance with the first radio access technology, wherein a predefined value for the CQI message is selected to indicate there is an overlap in respect of the radio resources to which the CQI message applies.

Paragraph 15. The method of any of paragraphs 1 to 14, wherein the terminal device determines if there is an overlap in radio resources according to the different configurations in accordance with a monitoring schedule which is initiated in response to receiving from the network infrastructure equipment the indication of the configuration of radio resources for communications with the network infrastructure equipment in accordance with the first radio access technology.

Paragraph 16. The method of any of paragraphs 1 to 15, further comprising: receiving from the network infrastructure equipment at least one further indication of at least one further configuration of radio resources within the second frequency band for use by the terminal device for communications with the network infrastructure equipment in accordance with the first radio access technology; and determining if there is an overlap in the radio resources associated with the at least one further configuration and the radio resources configured for use by the terminal device for communications in accordance with the second radio access technology, and wherein the signaling transmitted to the network infrastructure equipment to indicate there is an overlap further indicates the configuration of radio resources for communications within the second frequency band in accordance with the first radio access technology to which the overlap applies.

Paragraph 17. The method of any of paragraphs 1 to 16, further comprising the terminal device releasing the configuration of radio resources within the second frequency band for use by the terminal device for communications with the network infrastructure equipment in accordance with the first radio access technology in response to determining there is an overlap in the radio resources configured for use by the terminal device for communications in accordance with the first radio access technology and the radio resources configured for use by the terminal device for communications in accordance with the second radio access technology.

Paragraph 18. The method of any of paragraphs 1 to 17, wherein the second frequency band comprises radio resources which are shared with wireless communication devices that are not part of the wireless telecommunications system.

Paragraph 19. The method of any of paragraphs 1 to 18, wherein the second radio access technology is a non-cellular telecommunications radio access technology.

Paragraph 20. The method of any of paragraphs 1 to 19, wherein the second radio access technology is selected from the group comprising: a wireless local area network, WLAN, radio access technology; a Bluetooth radio access technology; and a global navigation satellite system, GNSS, radio access technology.

Paragraph 21. A terminal device for use in a wireless telecommunications system for communicating with network infrastructure equipment in accordance with a first radio access technology on a primary cell supporting a primary component carrier on radio resources within a first frequency band and a secondary cell supporting a secondary component carrier on radio resources within a second frequency band, wherein the terminal device is further operable to use radio resources within the second frequency band for communicating in accordance with a second radio access technology, and wherein the terminal device comprises a controller unit and a transceiver unit configured to operate together to: receive from the network infrastructure equipment an indication of a configuration of radio resources within the second frequency band for use by the terminal device for communications with the network infrastructure equipment in accordance with the first radio access technology; establish a configuration of radio resources within the second frequency band for use by the terminal device for communications in accordance with the second radio access technology; determine if there is an overlap in the radio resources configured for use by the terminal device for communications in accordance with the first radio access technology and the radio resources configured for use by the terminal device for communications in accordance with the second radio access technology, and if so, transmit signaling to the network infrastructure equipment to indicate there is an overlap.

Paragraph 22. Circuitry for a terminal device in a wireless telecommunications system for communicating with network infrastructure equipment in accordance with a first radio access technology on a primary cell supporting a primary component carrier on radio resources within a first frequency band and a secondary cell supporting a secondary component carrier on radio resources within a second frequency band, wherein the terminal device is further operable to use radio resources within the second frequency band for communicating in accordance with a second radio access technology, wherein the circuitry comprises a controller element and a transceiver element configured to operate together to: receive from the network infrastructure equipment an indication of a configuration of radio resources within the second frequency band for use by the terminal device for communications with the network infrastructure equipment in accordance with the first radio access technology; establish a configuration of radio resources within the second frequency hand for use by the terminal device for communications in accordance with the second radio access technology; determine if there is an overlap in the radio resources configured for use by the terminal device for communications in accordance with the first radio access technology and the radio resources configured for use by the terminal device for communications in accordance with the second radio access technology, and if so, transmit signaling to the network infrastructure equipment to indicate there is an overlap.

Paragraph 23. A method of operating network infrastructure equipment in a wireless telecommunications system for communicating with a terminal device in accordance with a first radio access technology on a primary cell supporting a primary component carrier on radio resources within a first frequency hand and a secondary cell supporting a secondary component carrier on radio resources within a second frequency band, wherein the terminal device is further operable to use radio resources within the second frequency band for communicating in accordance with a second radio access technology, wherein the method comprises: establishing a configuration of radio resources within the second frequency band for use by the terminal device for communications with the network infrastructure equipment in accordance with the first radio access technology; transmitting to the terminal device an indication of the configuration of radio resources within the second frequency band for use by the terminal device for communications with the network infrastructure equipment in accordance with the first radio access technology; receiving from the terminal device an indication of an overlap in the radio resources configured for use by the terminal device for communications in accordance with the first radio access technology and radio resources which the terminal devoice has established are needed for use by the terminal device for communications in accordance with the second radio access technology; establishing a replacement configuration of radio resources within the second frequency band for use by the terminal device for communications with the network infrastructure equipment in accordance with the first radio access technology, wherein the replacement configuration is selected to avoid radio resources in respect of which the overlap is indicated; and transmitting to the terminal device an indication of the replacement configuration of radio resources within the second frequency band for use by the terminal device for communications with the network infrastructure equipment in accordance with the first radio access technology.

Paragraph 24. Network infrastructure equipment for use in a wireless telecommunications system for communicating with a terminal device in accordance with a first radio access technology on a primary cell supporting a primary component carrier on radio resources within a first frequency band and a secondary cell supporting a secondary component carrier on radio resources within a second frequency band, wherein the terminal device is further operable to use radio resources within the second frequency band for communicating in accordance with a second radio access technology, and wherein the network infrastructure equipment comprises a controller unit and a transceiver unit configured to operate together to: establish a configuration of radio resources within the second frequency band for use by the terminal device for communications with the network infrastructure equipment in accordance with the first radio access technology; transmit to the terminal device an indication of the configuration of radio resources within the second frequency band for use by the terminal device for communications with the network infrastructure equipment in accordance with the first radio access technology; receive from the terminal device an indication of an overlap in the radio resources configured for use by the terminal device for communications in accordance with the first radio access technology and radio resources which the terminal devoice has established are needed for use by the terminal device for communications in accordance with the second radio access technology; establish a replacement configuration of radio resources within the second frequency band for use by the terminal device for communications with the network infrastructure equipment in accordance with the first radio access technology, wherein the replacement configuration is selected to avoid radio resources in respect of which the overlap is indicated; and transmit to the terminal device an indication of the replacement configuration of radio resources within the second frequency band for use by the terminal device for communications with the network infrastructure equipment in accordance with the first radio access technology.

Paragraph 25. Circuitry for network infrastructure equipment for use in a wireless telecommunications system for communicating with a terminal device in accordance with a first radio access technology on a primary cell supporting a primary component carrier on radio resources within a first frequency band and a secondary cell supporting a secondary component carrier on radio resources within a second frequency band, wherein the terminal device is further operable to use radio resources within the second frequency band for communicating in accordance With a second radio access technology, and wherein the circuitry comprises a controller element and a transceiver element configured to operate together to: establish a configuration of radio resources within the second frequency band for use by the terminal device for communications with the network infrastructure equipment in accordance with the first radio access technology; transmit to the terminal device an indication of the configuration of radio resources within the second frequency band for use by the terminal device for communications with the network infrastructure equipment in accordance with the first radio access technology: receive from the terminal device an indication of an overlap in the radio resources configured for use by the terminal device for communications in accordance with the first radio access technology and radio resources which the terminal devoice has established are needed for use by the terminal device for communications in accordance with the second radio access technology; establish a replacement configuration of radio resources within the second frequency band for use by the terminal device for communications with the network infrastructure equipment in accordance with the first radio access technology, wherein the replacement configuration is selected to avoid radio resources in respect of which the overlap is indicated; and transmit to the terminal device an indication of the replacement configuration of radio resources within the second frequency band for use by the terminal device for communications with the network infrastructure equipment in accordance with the first radio access technology.

REFERENCES

[1] Holma H. and Toskala A, "LTE for UMTS OFDMA and SC-FDMA based radio access", John Wiley and Sons, 2009
[2] ETSI TS 136 211 V11.5.0 (2014 Jan.)/3GPP TS 36.211 version 11.5.0 Release 11
[3] ETSI TS 136 212 V11.4.0 (2014 Jan.)/3GPP TS 36.212 version 11.4.0 Release 11
[4] ETSI TS 136 213 V11.6.0 (2014 Mar.)/3GPP TS 36.213 version 11.6.0 Release 11
[5] ETSI TS 136 321 V11.5.0 (2014 Mar.)/3GPP TS 36.321 version 11.5.0 Release 11
[6] ETSI TS 136 331 V12.2.0 (2014 Jun.)/3GPP TS 36.331 version 12.2.0 Release 12
[7] ETSI TR 136 816 V11.2.0 (2011 Dec.)/3GPP TR 36.816 version 11.2.0 Release 11
[8] ETSI TS 136 300 V12.2.0 (2014 Jun.)/3GPP TS 36.300 version 12.2.0 Release 12
[9] European patent application EP 14171284.4 (Sony Corporation) filed on 5 Jun. 2014
[10] European patent application EP 14171285.1 (Sony Corporation) filed on 5 Jun. 2014

What is claimed is:

1. Circuitry for a terminal device in a wireless telecommunications system for communicating in accordance with a first radio access technology on a primary cell supporting a primary component carrier on radio resources within a first frequency band and a secondary cell supporting a secondary component carrier on radio resources within a second frequency band, wherein the terminal device is configured to use radio resources within the second frequency band for communicating in accordance with a second radio access technology, wherein the circuitry is configured to:
    receive an indication of a configuration of radio resources within the second frequency band for use by the terminal device for communications in accordance with the first radio access technology;
    establish a configuration of radio resources within the second frequency band for use by the terminal device for communications in accordance with the second radio access technology;
    determine if there is an overlap in the radio resources configured for use by the terminal device for communications in accordance with the first radio access technology and the radio resources configured for use by the terminal device for communications in accordance with the second radio access technology, and if so, transmit 1 to the telecommunication system to indicate a potential for inter-frequency interference arising between different frequencies associated with different radio access technologies supported by the terminal device;
    receive an indication of an updated configuration of radio resources within the second frequency band for use by the terminal device for communications with the telecommunication system in accordance with the first radio access technology in response to transmitting the IDC message to the telecommunication system; and
    determine if the radio resources associated with the updated configuration includes radio resources in respect of which the indication of the overlap is transmitted to the telecommunication system, and if so, classify the updated configuration as an invalid configuration or as an unsupported configuration.

2. The circuitry of claim 1, wherein
the circuitry is configured to determine if the radio resources associated with the updated configuration includes radio resources in respect of which the indication of the overlap is transmitted to the telecommunication system, and if so, revert to a radio resource control (RRC) idle mode in respect of the secondary component carrier.

3. The circuitry of claim 1, wherein
the circuitry is configured to receive an indication that the configuration of radio resources within the second frequency band for use by the terminal device for communications with the telecommunication system in accordance with the first radio access technology is no longer valid.

4. The circuitry of claim 1, wherein
the IDC message to the telecommunication system is associated with an indication of the radio resources in respect of which the overlap applies.

5. The circuitry of claim 1, wherein
the circuitry is configured to use radio resources within the second frequency band for communicating in accordance with a number of different radio access technologies which are different to the first radio access technology, and
the IDC message to the telecommunication system comprises an indication of the second radio access technology in respect of which the overlap has been determined.

6. The circuitry of claim 1, wherein
the IDC message transmitted to the telecommunication system comprises radio resource control (RRC) signaling.

7. The circuitry of claim 1, wherein
the IDC message conforms to an IDC message format.

8. The circuitry of claim 5, wherein
the IDC message transmitted to the telecommunication system comprises a message conforming to the IDC message format with an information element selectively set to a value to indicate whether or not there is an overlap in respect of radio resources identified in the message.

9. The circuitry of claim 8, wherein
the information element is dedicated to the purpose of indicating whether or not there is an overlap in respect of radio resources identified in the message.

10. The circuitry of claim 8, wherein
the information element is associated with indicating an aspect of potential inter-frequency interference arising between different frequencies associated with different radio access technologies supported by the terminal device, and in the case of overlap is set to a value which is different from the values used when the information element is used to indicate an aspect of potential inter-frequency interference.

11. The circuitry of claim 10, wherein
the aspect of potential inter-frequency interference with which the information element is associated in accordance with the predefined inter-frequency IDC message format is an indication of the direction of interference between the different radio access technologies.

12. The circuitry of claim 1, wherein
the terminal device determines if there is an overlap in radio resources according to the different configurations in accordance with a monitoring schedule which is initiated in response to receiving the indication of the configuration of radio resources for communications with the telecommunication system in accordance with the first radio access technology.

13. The circuitry of claim 1, further configured to:
receive at least one further indication of at least one further configuration of radio resources within the second frequency band for use by the terminal device for communications with the telecommunication system in accordance with the first radio access technology; and
determine if there is an overlap in the radio resources associated with the at least one further configuration and the radio resources configured for use by the terminal device for communications in accordance with the second radio access technology, wherein
the IDC message transmitted to the telecommunication system indicates the configuration of radio resources for communications within the second frequency band in accordance with the first radio access technology to which the overlap applies.

14. The circuitry of claim 1, wherein
the circuitry is configured to release the configuration of radio resources within the second frequency band for use by the terminal device for communications with the telecommunication system in accordance with the first radio access technology in response to determining there is an overlap in the radio resources configured for use by the terminal device for communications in accordance with the first radio access technology and the radio resources configured for use by the terminal device for communications in accordance with the second radio access technology.

15. The circuitry of claim 1, wherein
the second frequency band comprises radio resources which are shared with wireless communication devices that are not part of the wireless telecommunications system.

16. Circuitry for network infrastructure equipment for use in a wireless telecommunications system for communicating with a terminal device in accordance with a first radio access technology on a primary cell supporting a primary component carrier on radio resources within a first frequency band and a secondary cell supporting a secondary component carrier on radio resources within a second frequency band, wherein the terminal device is further operable to use radio resources within the second frequency band for communicating in accordance with a second radio access technology, the circuitry configured to:
establish a configuration of radio resources within the second frequency band for use by the terminal device for communications with the network infrastructure equipment in accordance with the first radio access technology;
transmit to the terminal device an indication of the configuration of radio resources within the second frequency band for use by the terminal device for communications with the network infrastructure equipment in accordance with the first radio access technology;
receive from the terminal device an inter-frequency in-device coexistence (IDC) message indicating of an overlap in the radio resources configured for use by the terminal device for communications in accordance with the first radio access technology and radio resources which the terminal device has established are needed for use by the terminal device for communications in accordance with the second radio access technology;
establish a replacement configuration of radio resources within the second frequency band for use by the terminal device for communications with the network infrastructure equipment in accordance with the first radio access technology, wherein the replacement configuration is selected to avoid radio resources in respect of which the overlap is indicated; and
transmit to the terminal device an indication of the replacement configuration of radio resources within the second frequency band for use by the terminal device for communications with the network infrastructure equipment in accordance with the first radio access technology, wherein the terminal device is configured to revert to a radio resource control (RRC) idle mode in respect of the secondary component carrier in a case that it is determined that the radio resources associated with the updated configuration includes radio resources in respect of which the indication of overlap is indicated in the IDC message.

17. Circuitry for a terminal device in a wireless telecommunications system for communicating in accordance with a first radio access technology on a primary cell supporting a primary component carrier on radio resources within a first frequency band and a secondary cell supporting a secondary component carrier on radio resources within a second frequency band, wherein the terminal device is configured to use radio resources within the second frequency band for communicating in accordance with a second radio access technology, wherein the circuitry is configured to:
receive an indication of a configuration of radio resources within the second frequency band for use by the terminal device for communications in accordance with the first radio access technology;
establish a configuration of radio resources within the second frequency band for use by the terminal device for communications in accordance with the second radio access technology;
determine if there is an overlap in the radio resources configured for use by the terminal device for communications in accordance with the first radio access technology and the radio resources configured for use by the terminal device for communications in accordance with the second radio access technology, and if so, transmit an inter-frequency in-device coexistence (IDC) message to the telecommunication system to indicate a potential for inter-frequency interference arising between different frequencies associated with different radio access technologies supported by the terminal device;
receive an indication of an updated configuration of radio resources within the second frequency band for use by the terminal device for communications with the telecommunication system in accordance with the first radio access technology in response to transmitting the IDC message to the telecommunication system; and
determine if the radio resources associated with the updated configuration includes radio resources in respect of which the indication of the overlap is transmitted to the telecommunication system, and if so, revert to a radio resource control (RRC) idle mode in respect of the secondary component carrier.

* * * * *